United States Patent Office 2,866,321
Patented Dec. 30, 1958

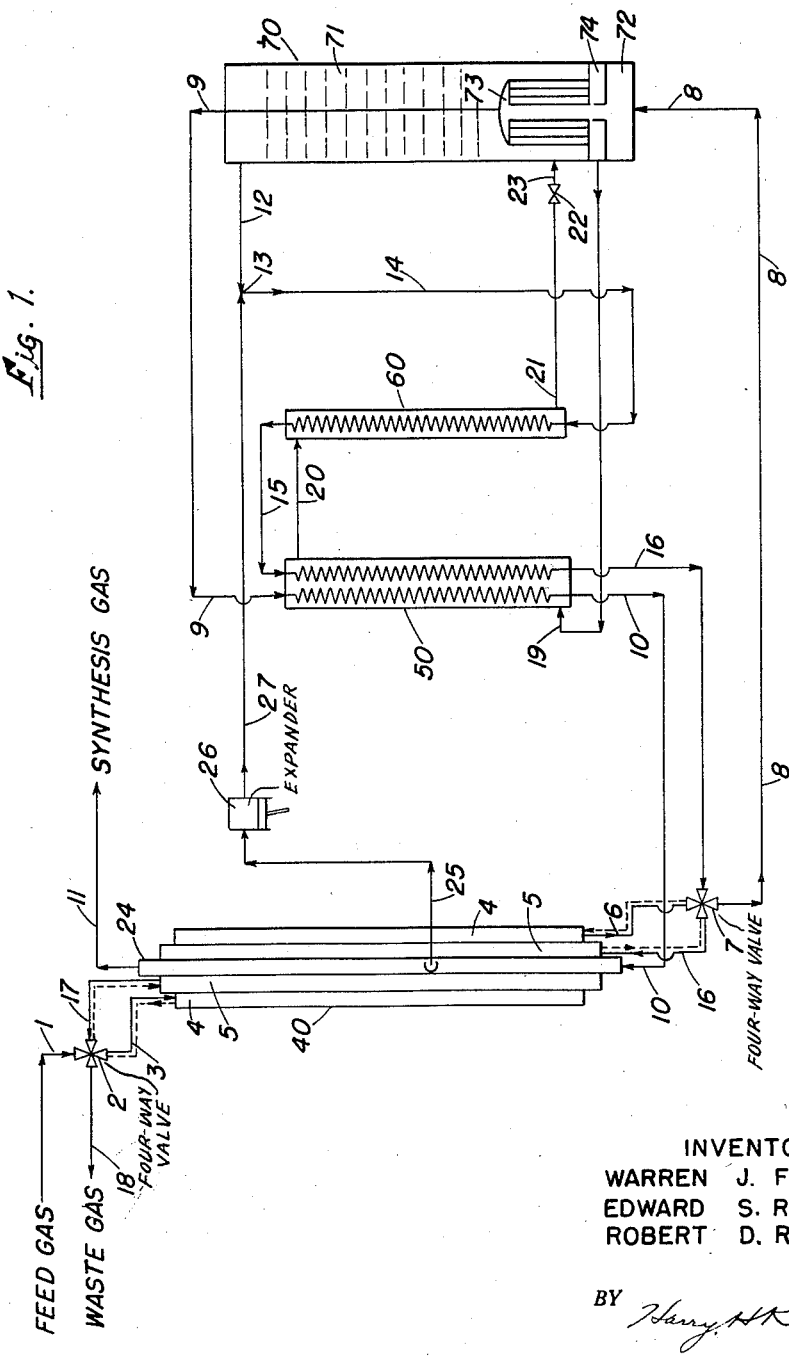

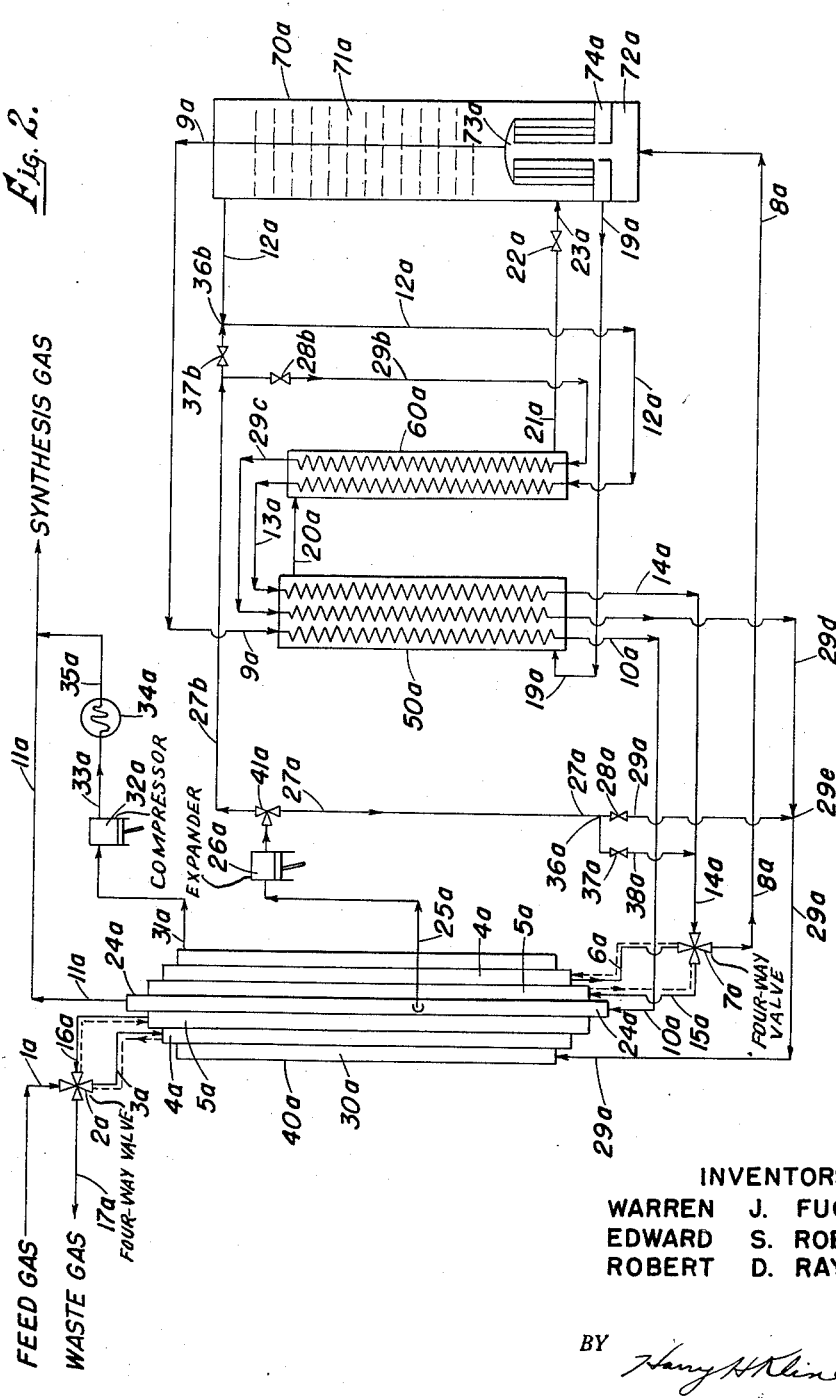

2,866,321

PURIFICATION OF GASES BY PARTIAL CONDENSATION

Warren J. Fuchs, Edward S. Roberts, and Robert D. Rayfiel, New York, N. Y., assignors to Chemical Construction Corporation, New York, N. Y., a corporation of Delaware Application August 6, 1954, Serial No. 448,318

15 Claims. (Cl. 62—13)

This invention relates to low-temperature separation of gas mixtures. More particularly, it concerns the separation of oxidized hydrocarbon fuel gas mixtures into a "nitrogen" fraction and a "hydrogen-nitrogen" fraction adapted for ammonia synthesis.

Separation of a normally gaseous mixture such as air into component fractions is known to be accomplished by compressing and precooling feed gas, liquefying, at initial pressure, a portion of the mixture by heat exchange with cold separated products, expanding another portion with external work, fractionating both portions in a common fractionating tower at lower pressure, and the return of final products.

Precooling is accomplished by two or more regenerators in periodically reversing cycles between incoming feed gas and backwardly returning products. Such regenerators also remove water, carbon dioxide and the like which deposit on the surfaces of the regenerator packing as feed gas is cooled and then re-evaporated during the succeeding phase of the cycle to eliminate frequent thawings. However, heat transfer between the reversing streams depends upon heat storage in the regenerator packing. As a result, regenerators have the distinct disadvantage that the incoming and outgoing streams are never in simultaneous thermal contact with each other across a common heat interchange boundary, and it is for this reason that the cycle time in the regenerators affects a heat transfer efficiency as well as the quantity of the deposited impurities accumulated in the regenerators.

It has been suggested that a reversing exchanger, which permits a simultaneous heat interchange between passageways containing countercurrently flowing feed gas streams and returning cold products, be employed for precooling the gaseous mixture. The exchanger comprises a plurality of parallel paths for the fluid in each passageway. The paths are so metal bonded together as to establish a metal contact throughout the whole contact length of the exchanger. Likewise the several passages are joined with metal to metal contact. Reversing exchangers of this type are characterized by a high rate of heat transfer and thermal efficiency unaffected by cycle time because little or no dependence is placed on storage of heat in metal. They are employed to remove almost all of the higher boiling impurities from the feed gas. This is accomplished by periodically alternating the flow of warm incoming feed gas and a backward returning cold gas between at least two passageways of the exchanger. During one-half of the reversing cycle when feed gas is being cooled, water, carbon dioxide and other impurities are precipitated and accumulated in solid or liquid phase on metal surfaces of the passageway through which feed gas at that time is flowing. Before accumulations clog that passageway, countercurrently flowing streams of feed gas and returning cold gas are interchanged to enable the cold gas to flow over the accumulated deposits to re-evaporate them. Meanwhile, the feed gas is cooled and impurities therein are precipitated on metal surfaces of the alternate passageway through which returning cold gas product had flowed previously. Re-evaporation of impurities that were formerly deposited in the passageways is effected with that cold gas of the separation whose recovery in a pure state is undesired, although a stream of desired returning product gas is permitted to pass through a separate non-reversing passageway of the same exchanger to recoup the cold therefrom.

The present invention is directed amongst others to the establishment of those conditions which are required for the complete re-evaporation of the impurities that are deposited either in reversing regenerators or cold exchangers. Specifically, these conditions are a function of the volume of gas into which the deposits can be evaporated and removed and of sufficient vapor pressure of the deposited impurities as is determined by the temperature of returning cold gas in the region of the said deposited impurities. In general, impurities are usually deposited at one temperature and are removed at some lower temperature. Accordingly, the smaller the difference between these two temperatures, the greater will be the rate of re-evaporation.

It is an object of the present invention to provide for the obtainment of these small temperature differences in any desired region of a reversing countercurrent exchanger or regenerator in which evaporation of solidified higher boiling impurities is being effected. Other objects and advantages will become apparent from the following description.

To this end, the process of the present invention contemplates the diversion of a minor proportion, say between 5 to 20%, of compressed gas, hereinafter known as synthesis gas, from a separate passageway of a reversing exchanger or regenerator at a predetermined temperature level. It is then expanded, yielding work to supply needed refrigeration.

The expanded gas is added to impure cold gas, hereinafter known as waste gas, at one of several points in the process. First, it may be added to waste gas immediately upon the latter's removal from a partial condenser. This is shown in Fig. 1 of the drawing. Second, the expanded gas may be added to waste gas subsequent to the latter's passage through a sub-cooler as shown in Fig. 2. Third, the expanded gas may be added directly to the passageway in which waste gas has previously flowed as shown in Fig. 2. Any accumulated impurities remaining in that cleansing cycle may be completely removed by the expanded gas. Advantageously, the expanded gas is then recompressed and added to incoming feed gas. Fourth, the expanded gas may be directed to a separate non-reversing passageway in the exchanger or regenerator so as to abstract heat from the incoming gases. This is illustrated in Fig. 2. Thereafter, the thus warmed expanded gas is compressed. The compressed gaseous product is then cooled and directed to the synthesis gas emanating from cold exchanger or regenerator.

For a more complete understanding of the nature and object of this invention, reference should be made to the following detailed description taken in conjunction with the accompanying drawings in which are illustrated the apparatus suitable for carrying out the invention. While the reversing exchanger shown therein is a single exchanger, it should be understood that more than one exchanger either in series or parallel can be used. Further, in practicing this invention any normally gaseous mixture may be used. Typical gases include air, producer gas, and a gas mixture obtained from the air oxidation of hydrocarbon fuels, which is particularly well suited for ammonia synthesis and the like.

Unless otherwise noted, all temperatures and pressures are in degrees Fahrenheit and in pounds per square inch gauge, respectively.

In the embodiment of Figure 1, a backward-returning synthesis gas is shown as being diverted at an intermediate temperature point in a non-reversing path of the reversing exchanger. It is thereafter expanded and introduced into the waste gas stream at a point prior to its introduction into a sub-cooler. Figure 2 shows a modification of the Figure 1 flow diagram wherein expanded gas is introduced into waste gas at a point either prior to or subsequent to the flow of the waste gas through sub-coolers and prior to its introduction into the reverse exchanger at the colder level thereof. As is also shown in Figure 2, the expanded gas is either introduced into a separate passageway adjacent to the reversing passageway or is fed into sub-coolers prior to its introduction into a separate passageway of the reverse exchanger. Expanded gas is then exited at the warmer end of the reverse exchanger and is compressed and cooled. The gas is then introduced into synthesis gas which is exited at the warmer end of the reverse exchanger.

Referring now to Figure 1 of the drawing, a feed gas, more fully described hereinafter, is directed through line 1, into line 3 through a reversing four-way reversing valve 2 or its mechanical equivalent. It is timed to switch at predetermined intervals, say every three minutes, and the gas is led into passageway 4. As gas flows through passageway 4 in reverse exchanger 40, it is progressively being cooled, due to the flow of cold waste gas in passageway 5. As a result, there is a heat exchange. The cooled feed gas is purified by the precipitation of impurities, for example, water and carbon dioxide, upon the walls of said passageway. The feed gas is then exited through line 6 to line 8 through a four-way reversing valve 7 into a partial condenser. The latter will be described hereinafter. Waste gas is exited in the warmer end of the exchanger through line 17 and 18, controlled by a four-way reversing valve 2.

The partial condenser 70 comprises a lower section 72 which is operated at pressures approximating the pressure of the feed gas and an upper section 71 that is operated at a lower temperature, from about 3 to 10 pounds, preferably at about 4-5 pounds. Condenser 70 is provided with plates of bubble-cap or other standard type. The lower section 72 communicates with condenser 73 and has a liquid collecting shelf 74 disposed immediately below condenser 73 for collecting liquid or condensate. As feed gas enters the condenser at lower section 72 through line 8, partial condensation takes place due to the fact that it is being rapidly cooled. This is accomplished by use of the liquid or condensate withdrawn from the liquid shelf 74 through line 19. This condensate is introduced into the bottom of a sub-cooler 50. Coldness is imparted thereto due to a countercurrent heat interchange between it and waste gas, described hereinafter. The condensate is then withdrawn in line 20 and introduced into the top of a second sub-cooler 60 where the condensate is further cooled and is exited through line 21 and expanded through a valve 22. The expanded liquid is fed through line 23 and introduced into the partial condenser 70 at the lower pressure section shown as compartment 71. The condensate or liquid is converted to a gas due to heat absorption in compartment 71. It is withdrawn as a cold waste gas through line 12 and is directed to line 14 through point 13. The cold waste gas is then introduced in a separate passageway into the sub-cooler 60 in countercurrent flow to the liquid condensate. The slightly warmed waste gas is then withdrawn from sub-cooler 60 and introduced into a separate passageway of sub-cooler 50 where it imparts additional cold to condensate flowing therethrough. It is withdrawn through line 16 and introduced into the reverse exchanger 40 at the colder end through valve 7. At that end, the temperature of waste gas approximates the temperature of the precooled feed gas, although waste gas is slightly colder than the feed gas. Usually the difference is between about 3° F. and 12° F. As waste gas flows through the reverse exchanger 40, it precools incoming warm feed gas. Waste gas is exited through line 17 and 18 controlled by reversing four-way switch valve 2. Meantime, synthesis gas, which is obtained by partially condensing the feed gas in the condenser 73, is withdrawn through line 9 and introduced into sub-cooler 50 in a separate path. It is warmed due to heat interchange between the comparatively warm condensate and the relatively cool synthesis gas. The gas exited and introduced into line 10 approximates the temperature of the waste gas, the difference being that the synthesis gas is under positive pressure approximating that of the incoming feed gas, whereas the pressure of the waste gas is at some lower pressure, usually approximating atmospheric. The synthesis gas is then introduced into a separate non-reversing path 24 in reverse exchanger 40 and is exited at the warmer end in line 11. At a predetermined point, however, a minor portion of the synthesis gas is diverted from the passageway in reverse exchanger 40 and is introduced into line 25 which leads to an expander 26. The gas so expanded is withdrawn through line 27 and introduced into the waste gas at point 13. Thus, the volume of the waste gas is increased to effect additional refrigeration and to insure the complete removal of accumulated or precipitated impurities. In the reversing cycle, feed gas is introduced into reverse exchanger 40 (as indicated by dotted lines) through line 1 and 17 through a four-way reversing switch 2. The waste gas is excited at line 3 and 18 through reversing valve 2 (similarly indicated by dotted lines). The pre-cooled feed gas at the colder end of the reverse exchanger is exited through line 16 and 8 through a reversing valve 7. The waste gas is introduced into the exchanger at this point through line 16 and 6 controlled by the four-way reversing valve 7.

As noted above, Figure 2 illustrates a modification of the Figure 1 flow. In this embodiment, feed gas is permitted to flow into reverse-cold exchanger 40a through line 1a controlled by four-way reversing valve 2a or a mechanical equivalent thereof, properly timed to permit periodic switching of the flow of gaseous streams through reversing exchanger 40a, say every three minutes. The feed gas is then led through pipe 3a into passageway 4a which contains fins made from a heat conducting material such as copper. Similarly, passageways 5a, 24a and 30a in exchanger 40a are constructed in a like manner. The feed gas is pre-cooled progressively due to heat exchange with outgoing waste gas and outgoing synthesis gas. Carbon dioxide, water and other impurities are removed by precipitation in passageway 4a. Pre-cooled gas is then exited through line 6a through four-way reversing valve 7a to line 8a and introduced into partial condenser 70a. The latter comprises two compartments, a low pressure compartment 71a and a high pressure compartment 72a, as well as a condenser 73a together with a liquid collecting tray 74a. The liquid or condensate in 74a is withdrawn through line 19a and introduced into the bottom of sub-cooler 50a which flows therethrough. It is in indirect contact with separate streams of synthesis and waste gases, emanating from the condenser 70a, described hereafter. The condensate is cooled and withdrawn from the top of sub-cooler 50a through line 20a into sub-cooler 60a where it is further cooled. The cooled condensate is withdrawn through line 21a through a reducing valve 22a and ultimately introduced into low pressure compartment 71a of partial condenser 70a through line 23a. Due to the presence of comparatively warm feed gas in condenser 73a, the liquid condensate is vaporized to a gas (hereafter termed waste gas) and is withdrawn through line 12a; the latter being introduced into sub-cooler 60a. Since waste gas is colder than the liquid condensate, it imparts coldness to the condensate and abstracts heat from the latter. The slightly warmed waste gas is then introduced into sub-cooler 50a through line 13a where it is further warmed and is withdrawn through line 14a to control valve 7a to passageway 5a through line 15a of exchanger 40a. The temperature of the pre-cooled feed gas and that of the waste gas introduced at this point differs in the order of from 3° F. to 12° F. The waste gas is then exited through lines 16a and 17a controlled by reversing valve 24. Simultaneously, synthesis gas in condenser 73a is exited through line 9a to the top of sub-cooler 50a in a separate passageway. The latter gas is fed from the sub-cooler 50a through line 10a, being introduced into passageway 24a at the colder end of reverse exchanger 40a. The synthesis gas is warmed progressively as it traverses the passageway to the warmer end and is ultimately eliminated through line 11a. A minor portion of that gas, however, is withdrawn at a predetermined temperature point to an expander 26a through line 25a. The gas is expanded with work and is fed through a two-way control valve 41a to line 27a. Flow of gas through line 27b is not permitted. From point 36a, it is then introduced into the waste gas through open control valve 37a and into line 38a, while control valve 28a is closed. When control valve 37a is closed, the expanded gas from point 36a passes through line 29a, through control valve 28a, into a separate passageway in the exchanger 40a. Alternatively, expanded gas may be split at point 36a, permitting flow through open valves 28a and 37a. Refrigeration is thus imparted to the reversing exchanger and the gas is conserved by withdrawing it through line 31a, to a compressor 32a, to line 33a. The compressed gas is cooled by means of water in a heat exchanger 34a and exited from the latter through line 35a. The cooled compressed gas is then added to synthesis gas in line 11a.

As is also illustrated in Fig. 2, the expanded gas which is exited from expander 26a is alternatively fed to line 27b through a three-way two port control valve 41a. Flow through line 27a is prevented. This procedure is advantageous in that expanded gas is either mixed with waste gas leaving partial condenser 70 or is introduced into sub-coolers directly for purposes of supplying additional refrigeration and purifying capacity. However, the expanded gas in line 27b can be split so as to flow through lines 29b and 12a simultaneously. In one embodiment, the expanded gas in line 27b flows through control valve 37b while valve 28b is closed. It is mixed with waste gas in line 12a at point 36b and the mixture of gases is introduced in a separate path through line 12a at the bottom of the sub-cooler 60a. It is withdrawn therefrom through line 13a, introduced into the top of sub-cooler 50a, exited through line 14a and introduced into a separate reversing passageway of exchanger 40a through control valve 7a. In the second embodiment, the expanded gas flows through line 27b and is directed through line 29b through open control valve 28b, while valve 37b is closed. The expanded gas is introduced in a separate path at the bottom of sub-cooler 60a and is withdrawn from the top through 29c. It is then introduced into the top of sub-cooler 50a in a separate path and withdrawn through line 29d which leads into line 29a at a point 29e. The expanded gas is then introduced in a separate non-reversing path of exchanger 40a. A third embodiment contemplates the flow of the expanded gas through lines 12a and 29b simultaneously while permitting control valves 28b and 37b to remain open. In these embodiments, the expanded gas which is either added to the waste gas at point 36b or is unmixed is in countercurrent, indirect heat-interchange relationship in the sub-coolers with the liquid condensables emanating from the liquid shelf 74a. The temperature and pressure of the expanded gas are so adjusted as to approximate the temperature and pressure of the waste gas flowing through line 12a. The adjustment of these conditions is accomplished by diverting a portion of the synthesis gas in the non-reversing path of the reversing exchanger 40a at a predetermined temperature level through the expander 26a. The procedure is discussed more fully hereinafter.

As a modification relative to the introduction of the expanded stream flowing through line 27a directly into the waste gas stream in Fig. 2, expanded gas may be introduced into line 14a at a time prior to the reversing of the cycle in the exchanger 40a but subsequent to the stopping of flow of waste gas through line 4a. In this manner, any impurities occluded in passageway 5a due to a previous run and after initial re-evaporation of condensables are removed along with the expanded gas. Hence, control valve 37a may be adjusted by a time mechanism to open after the cessation of waste gas flow. It is understood, of course, that during this mode of operation, control valve 28a is closed.

Advantages of the present invention are multifold. Where a feed gas produced by partial oxidation of cheap fuels with air is employed in the process of the invention, the nitrogen content therein is readily adjusted for ammonia production. Further, expansion of part of the synthesis gas, diverted from the non-reversing passageway of the reversing exchanger through an expansion engine or turbine, supplies refrigeration without the deposition of solid impurities in that engine. A waste gas containing impurities when expanded leads to sticking valves or eroded rotors in the engine. Contrariwise, a purified synthesis gas is expanded herein. Moreover, expanded gas increases both the effective heat capacity and carbon dioxide re-evaporation capacity when added to waste gas. These increases are extremely desirable. Additionally, sub-cooling of the liquid condensate minimizes the formation of vapor on expansion. The subcooled waste gas that passes through the subcooler with concomitant warming of waste gas ultimately gives a close temperature approach in the cold zone of the reversing exchangers where impurities must be re-vaporized.

To particularize the functioning of the reversing-exchanger sub-coolers, expander, compressor and partial condenser, a typical illustrative example is presented. It should be understood that the invention is not intended to be limited thereto.

A feed gas, obtained by the partial oxidation of fuel oil by means of compressed air, is quenched with water and the carbon monoxide content that results from the partial oxidation is converted to essentially hydrogen and carbon dioxide. Partial oxidation is conducted under superatmospheric pressure. The feed gas obtained therefrom is water-cooled to approximately 95° F., the pressure being maintained at approximately 160 pounds. The feed gas has the following composition in mol percentage on a dry basis:

| | |
|---|---|
| Carbon monoxide (CO) | 4.0 |
| Hydrogen ($H_2$) | 31.5 |
| Carbon dioxide ($CO_2$) | 15.1 |
| Methane ($CH_4$) | 0.4 |
| Nitrogen ($N_2$) | 48.1 |
| Argon (A) | 0.6 |
| Hydrogen sulfide ($H_2S$) | |
| Carbon disulfide ($CS_2$) | 0.3 |
| Carbonyl sulfide (COS) | |

As illustrated in Figure 1, the above feed gas, saturated with water vapor, enters the reversing exchanger 40 through line 1 at the rate of 100 S. C. F. M. (standard cubic feet per minute) at 160 pounds and 95° F. It is then led through line 3, controlled by a four-way reversing valve 2 into passageway 4 of reversing exchanger 40, where it is cooled progressively from 95° F. to minus 287° F., the dew point of nitrogen in the mixture. The $H_2O$, $CO_2$, $H_2S$, $CS_2$ and COS are condensed on the heat transfer surface leaving 84.6 S. C. F. M. of gas of the following composition in mol percent:

| | |
|---|---|
| CO | 4.74 |
| $H_2$ | 37.25 |
| $CH_4$ | 0.47 |
| $N_2$ | 56.83 |
| A | 0.71 |

The cooled feed gas (minus 287° F.) is exited through line 6 and 8 controlled by four-way reversing valve 7. It is introduced into high pressure compartment 72 of partial condenser 70 where 42.5 S. C. F. M. is condensed, leaving 42.1 S. C. F. M. of gaseous product. The composition of the liquid condensate which has collected in liquid tray 74, is in mol percent:

| | |
|---|---|
| CO | 9.13. |
| $CH_4$ | 0.92. |
| $N_2$ | 88.61. |
| A | 1.34. |
| $H_2$ | A minor quantity (equivalent to its solubility in said condensate). |

That portion of the pre-cooled feed gas which did not condense, termed synthesis gas, analyzed as follows in mol percent:

| | |
|---|---|
| CO | 0.28 |
| $CH_4$ | 0.03 |
| $N_2$ | 24.7 |
| $H_2$ | 74.95 |
| A | 0.04 |

The synthesis gas is therefore an excellent source for the synthesis of ammonia due to the fact that it approximates the composition of ammonia in that the ratio of nitrogen to hydrogen therein is approximately one to three.

Condensation of feed gas in condenser 73 occurs because the liquid condensate is sufficiently sub-cooled so that upon expansion to a decreased pressure of approximately 4 pounds, it imparts sufficient coldness to the incoming feed gases so as to condense out nitrogen and other high boiling components present in the feed gas. The expansion of the liquid condensate is effected in the following manner. Liquid condensate collected on tray 74 is diverted from partial condenser 70 through line 19 and introduced into the bottom of sub-cooler 50. The temperature of the liquid condensate prior to introduction to the sub-cooler is minus 287° F. which temperature is approximately the dew point of nitrogen. There, it is cooled to approximately minus 299° F., withdrawn through line 20 and introduced into the top of sub-cooler 60 where it is further cooled to minus 306° F. Cooling of the condensate in the sub-coolers is due to its contact with both synthesis and waste gases which emanate from the condenser. Synthesis gas flows through line 9 countercurrently in a separate path to the flow of the liquid condensate in heat interchange relationship. Since the synthesis gas is removed from the condenser 73 at minus 301° F., there occurs a heat interchange between the synthesis gas which is warmed to minus 292° F. and the liquid condensate which is cooled to minus 299° F. The temperature of the liquid condensate is further decreased to minus 306° F., due to the waste gas withdrawn from condenser 71 at approximately minus 316° F. and at a pressure of four pounds. Accordingly, there occurs cooling of liquid condensate in sub-cooler 60. The waste gas is exited from the condenser through line 12, past point 13, through line 14 and is introduced into sub-cooler 60; heat interchange takes place between the sub-cooled condensate entering sub-cooler 60 at approximately minus 299° F. and leaving at approximately minus 306° F. The waste gas is thereby heated to approximately minus 301° F. and is withdrawn through line 15 into a separate path of sub-cooler 50. The latter waste gas is exited through line 16 at approximately minus 292° F. The sub-cooled condensate, exited through line 21 at a temperature of minus 306° F., is expanded through a reducing valve 22 where its temperature is decreased from minus 306° F. to minus 316° F. and its pressure reduced from 160 pounds to approximately four pounds. The thus-expanded liquid condensate is then introduced into low pressure compartment 71 where it refrigerates condenser 73 and abstracts its heat so as to convert the liquid condensate to a gas, which gas is then withdrawn as waste gas at minus 316° F. through line 12.

The temperature of the synthesis gas and waste gas, which enter the colder end of the reversing exchanger 40, is approximately the same, namely, minus 292° F. However, the pressure of the synthesis gas is 160 pounds whereas the pressure of the waste gas is four pounds. The waste gas is progressively warmed in the exchanger and is exited through line 17 at 90° F. and at atmospheric pressure. It is warmed due to heat interchange between the waste gas and incoming feed gas as noted above. Synthesis gas is similarly warmed from minus 292° F. in a non-reversing passageway 24 and is exited from the reversing exchanger through line 11. However, its exiting pressure is approximately 150 pounds due to frictional resistance in the passageway. At a predetermined temperature of about minus 215° F., 12% of the synthesis gas is diverted from the stream passing through passageway 24 in exchanger 40 and is diverted to expander 26 through line 25. The gas is expanded to a temperature of minus 316° F. and pressure of four pounds and is introduced into the waste gas at point 13 through line 27.

Diversion of a portion of the synthesis gas is novel in low temperature gas separation and purification processes. Since expanded gas in this example is introduced into the waste gas at point 13, the intermediate temperature point in passageway 24 for the withdrawal of synthesis gas can be ascertained from thermodynamic data or in the absence of such data, from a temperature-pressure isentropic expansion of gas formula as modified by the efficiency of the expander 26. The formula is represented as follows:

$$\frac{T_2}{T_1} = (P_2/P_1)^{\frac{k-1}{k}}$$

where $T_2$ is the absolute temperature of waste gas (i. e., minus 316° F.), $T_1$ is the intermediate absolute temperature point to be determined, $P_2$ is the absolute pressure of waste gas (i. e., 19 p. s. i. a.), $P_1$ is the absolute pressure of the gas prior to expansion (i. e., 165 p. s. i. a.) and $k$ is a gas constant equal to 1.4 in this example. The temperature, $T_1$, can thus be determined since $P_1$, $P_2$ and $k$ are all known quantities. The temperature $T_1$ in this example is 270° Rankin. However, it is a theoretical temperature which is converted to the actual or real temperature, $T_r$, by the formula:

$$(T_1 - T_2)E = T_r - T_2$$

where $T_1$ and $T_2$ have the above values, E is the percent efficiency of an expander and $T_r$ is the real temperature. The standard efficiency of an expander is 80%. Accordingly, $T_r$ is 245° Rankin or minus 215° F.

In the reverse or alternating cycle of this example, the waste gas traverses the passageway previously followed by the feed gas and, due to the close approximation of temperature of feed gas and waste gas, substantially all the accumulated or precipitated impurities in the reversed passageway are so removed.

The process of the present invention is well suited for an ammonia synthesis gas containing more nitrogen than the usual 1:3 ratio as noted above. As such, feed gas may be produced by the partial oxidation of cheap fuels with air. One advantage of the process is that it eliminates the need for an air separation plant and a carbon dioxide absorption section of a standard oxidation process. Another advantage is that it reduces the flow of inerts or impurities to ammonia synthesis. While the process of the invention is particularly suited for the treatment of a gas made from the partial oxidation of cheap fuels with air, it can be applied to the separation and purification of any normally gaseous mixture such as air.

We claim:

1. In a method for treating a gaseous mixture whose components differ in boiling points which comprises:

passing a compressed gaseous stream of said mixture, the components of which differ in boiling points, in one direction of flow through a reversing heat-exchange zone along a pre-cooled path, said zone containing at least three paths; progressively decreasing the temperature in said zone from end to end to effect cooling of the stream and the resultant precipitation of a component of higher boiling point in the colder portion of said path, passing a second gaseous stream, free of the last mentioned component at a lower pressure and at a lower temperature than said first mentioned colder portion through a second path in the opposite direction of flow disposed in heat exchange relationship with first mentioned gaseous stream; periodically reversing the flow of said streams; passing a third compressed pre-cooled gaseous stream of low boiling components in a third non-reversing path into a colder portion of said path at the same temperature as said second mentioned gaseous stream; the improvement which comprises the steps of: diverting a minor portion of said third gaseous stream at an intermediate temperature point in said third path; expanding and cooling said stream, and introducing said expanded and cooled stream into the gases returning to the cold end of the reversing heat exchange zone exclusive of those gases flowing to said third non-reversing path.

2. In a method for purifying a gaseous mixture into its components which comprises: passing a compressed gaseous stream of said mixture, the components of which differ in boiling points in one direction of flow through a reversing heat-exchange zone along a pre-cooled path; said zone containing at least three paths; progressively decreasing the temperature in said zone from end to end to effect cooling of the stream and the resultant precipitation of a component of higher boiling point in the colder portion of said path; subsequently passing a second gaseous stream free of the last mentioned component at a lower pressure and at a lower temperature than said first mentioned colder portion through the same path in the opposite direction of flow after the first stream has stopped; passing a third compressed pre-cooled gaseous stream of low boiling components in a third non-reversing path into a colder portion of said path, diverting a minor portion of said third gaseous stream at an intermediate temperature point in said path; expanding and cooling said stream, introducing said expanded and cooled stream into the second gaseous stream prior to the introduction of the latter into the colder portion of said path to effect said subsequent passage of the second mentioned stream in an opposite direction and over the precipitate to remove the latter therefrom.

3. In a method for purifying a gaseous mixture into its components which comprises: passing a compressed gaseous stream of said mixture, the components of which differ in boiling points in one direction of flow through a reversing heat-exchange zone along a pre-cooled path, said zone containing at least three paths; progressively decreasing the temperature in said zone from end to end to effect cooling of the stream and the resultant precipitation of a component of high boiling point in the colder portion of said path; subsequently passing a second gaseous stream free from the last mentioned component at a lower pressure and at a lower temperature than said first mentioned colder portion through the same path in the opposite direction of flow after the first stream has stopped; passing a third compressed pre-cooled gaseous stream of low boiling components in a third non-reversing path into a colder portion of said path, diverting a minor portion of said third gaseous stream at an intermediate temperature point in said path; expanding and cooling said gaseous stream, introducing said expanded and cooled stream into the second gaseous stream after the latter had ceased to flow, removing any occluded precipitation in said second path, compressing and cooling the thus-exited expanded stream and adding the so-compressed stream to the first mentioned stream passing into the path prior to effecting the precipitation of a higher boiling component thereof.

4. In a method for treating a gaseous mixture whose components differ in boiling point which comprises: passing a compressed gaseous stream of said mixture, the components of which differ in boiling point in one direction of flow through a reversing heat-exchange zone containing at least four paths; progressively decreasing the temperature in said zone from end to end to effect cooling of the stream and the resultant precipitation of a component of higher boiling point in the colder portion of said path; passing a second gaseous stream, free of the last mentioned component at a lower pressure and at a lower temperature than said first mentioned colder portion through a second path in said zone in the opposite direction of flow disposed in heat-exchange relationship with first mentioned gaseous stream; periodically reversing the flow of said streams; passing a third compressed gaseous stream of low boiling components in a third non-reversing path into a colder portion of said path at the same temperature as said second mentioned gaseous stream; the improvement which comprises the steps of diverting a minor portion of said third gaseous stream at an intermediate temperature point in said third path; expanding and cooling said stream, introducing said expanded stream into a fourth non-reversing path adjacent to the first path in heat-exchange relationship thereto at the colder portion of said path, withdrawing the expanded and warmed gaseous stream from the heat-exchange zone, compressing and adding the compressed gas to the gaseous stream emanating from the third path in said zone.

5. A method for treating a gaseous mixture whose components differ in boiling points which comprises: passing a compressed gaseous stream of said mixture, the components of which differ in boiling points, in one direction of flow through a reversing heat-exchange zone along a pre-cooled path, said zone containing at least three paths; progressively decreasing the temperature in said zone from end to end to effect cooling of the stream and the resultant precipitation of a component of higher boiling point in the colder portion of said path; passing a second gaseous stream, free from the last mentioned component at a lower pressure and at a lower temperature than the first mentioned colder portion through a second path in the opposite direction of flow disposed in heat exchange relationship with the first mentioned gaseous stream; periodically reversing the flow of said streams; introducing the first mentioned stream into a high pressure compartment of a partial condenser consisting of a high and low pressure compartment to effect condensation of additional higher boiling components, withdrawing the gaseous component of the first mentioned stream from the high pressure compartment of said partial condenser to a sub-cooling zone in heat exchange relationship with liquid condensables emanating from the said partial condenser to abstract coldness therefrom, pre-cooling the liquid condensables, expanding the condensables and flashing the latter into a low pressure compartment of the partial condenser to absorb heat by heat-interchange from the first mentioned gaseous stream, converting the liquid condensables in the low pressure compartment of the said partial condenser to a gas, exiting the gaseous stream from the low pressure compartment of the partial condenser to a second sub-cooling zone to effect further cooling of the liquid condensables, introducing the pre-heated gaseous stream emanating from latter mentioned second sub-cooling zone into the first mentioned sub-cooling zone and thence into the second mentioned path of the reversing-heat exchange zone, simultaneously introducing the preheated gaseous stream emanating from the high pressure compartment of the partial condenser and the first mentioned sub-cooling zone, respectively, into a third non-reversing path of the reversing heat-exchange zone, diverting a minor portion of said gaseous stream from said third path at an intermediate temperature point therein; expanding said stream to a temperature and pressure equal to the temperature and pressure of said second gaseous stream, introducing and enriching said expanded gaseous stream into the second gaseous stream prior to the latter's introduction into the colder portion of said path in the reversing heat-exchange zone to provide for additional refrigeration and purifying capacity of said gaseous stream, and periodically reversing the flow of the first and second mentioned streams in said reversing heat-exchange zone.

6. A process in accord with claim 5 wherein the minor portion of the expanded gas is introduced into the second gaseous stream at a point prior to the latter's introduction into the second-mentioned sub-cooling zone.

7. A process in accord with claim 5 wherein the minor portion of the expanded gas is introduced into the second gaseous stream at a point subsequent to the latter's flow through the first-mentioned sub-cooling zone.

8. A process in accord with claim 5 wherein the minor portion of expanded gas is introduced into the colder portion of the path of the reversing heat exchange zone after the second gaseous stream has ceased to flow but prior to the introduction of the first mentioned gaseous stream upon reversal of a cycle to effect removal of residual precipitate of higher boiling component and exiting the thus-warmed expanded gas stream from said path.

9. A method in accordance with claim 8 wherein the thus-warmed expanded gas from said path is compressed and the compressed gas introduced into the first mentioned gaseous stream.

10. A method for treating a gaseous mixture whose components differ in boiling points which comprises:. passing a compressed gaseous stream of said mixture, the components of which differ in boiling points, in one direction of flow through a reversing heat-exchange zone along a pre-cooled path, said zone containing at least three paths; progressively decreasing the temperature in said zone from end to end to effect cooling of the stream and the resultant precipitation of a component of higher boiling point in the colder portion of said path; passing a second gaseous stream, free from the last mentioned component at a lower pressure and at a lower temperature than the first mentioned colder portion through a second path in the opposite direction of flow disposed in heat exchange relationship with the first mentioned gaseous stream; periodically reversing the flow of said streams; introducing the first mentioned stream into a high pressure compartment of a partial condenser consisting of a high and low pressure compartment to effect condensation of additional higher boiling components, withdrawing the gaseous component of the first mentioned stream from the high pressure compartment of said partial condenser to a sub-cooling zone in heat exchange relationship with liquid condensables emanating from the said partial condenser to abstract coldness therefrom, precooling the liquid condensables, expanding the condensables and flashing the latter into a low pressure compartment of the partial condenser to absorb heat by heat-interchange from the first mentioned gaseous stream, converting the liquid condensables in the low pressure compartment of the said partial condenser to a gas, exiting the gaseous product from the low pressure compartment of the partial condenser to a second sub-cooling zone to effect further cooling of the liquid condensables and introducing the pre-heated gaseous stream emanating from latter mentioned second sub-cooling zone to the first mentioned sub-cooling zone and thence into the second mentioned path of the reversing heat-exchange zone, simultaneously introducing the preheated gaseous stream emanating from the high pressure compartment of the partial condenser and the first mentioned sub-cooling zone, respectively, into a third non-reversing path of the reversing heat-exchange zone, diverting a minor portion of said gaseous stream from said third path at an intermediate temperature point therein; expanding said gaseous stream, introducing said expanded gaseous stream into a fourth non-reversing path of the reversing heat-exchange zone at the colder portion thereof disposed in heat-exchange relationship with the first mentioned path, and at a temperature equal to the temperature of the second mentioned gaseous stream at the colder portion, exiting the warmer expanded gas at the warmer portion of said heat-exchange zone, compressing and cooling said gas and introducing the latter into the gaseous stream exited from said third non-reversing path.

11. A process in accord with claim 10 wherein the diverted gaseous stream is expanded to a temperature and pressure equal to the temperature and pressure of said second gaseous stream immediately prior to its introduction into the fourth non-reversing path.

12. A process in accord with claim 10 wherein the diverted gaseous stream is expanded to the temperature and pressure equal to the exited gaseous product emanating from the low pressure compartment, introducing said expanded gas into a separate path of the second sub-cooling zone, withdrawing the expanded gaseous product therefrom, introducing the latter into a separate path of the first mentioned sub-cooling zone, withdrawing the preheated gaseous stream from the first mentioned sub-cooling zone and introducing the expanded gaseous stream into the fourth non-reversing path at a temperature equal to that of the second mentioned stream at the colder portion.

13. A method in accord with claim 1 wherein the gaseous mixture is a mixture comprising nitrogen, hydrogen, carbon monoxide, carbon dioxide, methane and water vapor under superatmospheric pressure obtained by partially oxidizing fuel oil with compressed air, quenching the oxidized oil with water and recovering the gaseous mixture.

14. A method in accord with claim 5 wherein the gaseous mixture is a mixture comprising nitrogen, hydrogen, carbon monoxide, carbon dioxide and water vapor under superatmospheric pressure obtained by partially oxidizing fuel oil with compressed air, quenching the oxidized oil with water and recovering the gaseous mixture.

15. A method in accord with claim 14 wherein the compressed gaseous mixture is initially introduced into the first path of the reversing heat exchanger at a temperature and pressure of 95° F. and 160 p. s. i. g. and is exited from said path at a temperature of minus 287° F., corresponding to the dew point of nitrogen in said mixture.

References Cited in the file of this patent
UNITED STATES PATENTS
2,586,811    Garbo  ---------------- Feb. 26, 1952